United States Patent
Guan et al.

(12)

(10) Patent No.: US 11,750,013 B2
(45) Date of Patent: Sep. 5, 2023

(54) CHARGING METHOD FOR A BATTERY, AND AN ELECTRONIC DEVICE USING THE CHARGING METHOD

(71) Applicant: Ningde Amperex Technology Limited, Ningde (CN)

(72) Inventors: Ting Guan, Ningde (CN); Shan Zhu, Ningde (CN); Fei Wu, Ningde (CN)

(73) Assignee: NINGDE AMPEREX TECHNOLOGY LTD., Ningde (CN)

( * ) Notice: Subject to any disclaimer, the term of this patent is extended or adjusted under 35 U.S.C. 154(b) by 446 days.

(21) Appl. No.: 17/008,830

(22) Filed: Sep. 1, 2020

(65) Prior Publication Data

US 2021/0119466 A1  Apr. 22, 2021

Related U.S. Application Data

(63) Continuation-in-part of application No. PCT/CN2019/112385, filed on Oct. 21, 2019.

(51) Int. Cl.
*H02J 7/00* (2006.01)

(52) U.S. Cl.
CPC ........ *H02J 7/00714* (2020.01); *H02J 7/0048* (2020.01); *H02J 7/007182* (2020.01); *H02J 7/007192* (2020.01)

(58) Field of Classification Search
CPC . H02J 7/00714; H02J 7/0048; H02J 7/007182
USPC .................................................. 320/134, 137
See application file for complete search history.

(56) References Cited

U.S. PATENT DOCUMENTS

| | | | | |
|---|---|---|---|---|
| 7,224,218 B1 * | 5/2007 | Jiang | ..................... | H03F 3/2173 |
| | | | | 327/132 |
| 10,886,766 B2 * | 1/2021 | Luo | ................... | H02J 7/007184 |
| 2010/0327810 A1 * | 12/2010 | Jimbo | ................ | H01M 10/441 |
| | | | | 320/126 |
| 2013/0002221 A1 * | 1/2013 | Wang | .................... | H02M 3/158 |
| | | | | 323/283 |

FOREIGN PATENT DOCUMENTS

CN  107959071  4/2018

* cited by examiner

*Primary Examiner* — Arun C Williams
(74) *Attorney, Agent, or Firm* — Ladas & Parry LLP (57) ABSTRACT

A method for charging a battery, and electronic device using the method, includes charging the battery with a first charge current $I_m$ at constant current in a mth charge-discharge cycle of the battery, wherein the battery has a first cut-off voltage $V_1$ when the constant current charging stage of the battery is cut off in the mth charge-discharge cycle. The first charge current $I_m$ is calculated according to a formula $I_m = I_n + k \times I_n$, where, $0 < k \leq 1$, $I_n$ is the charging current of the constant current charging stage of the battery or another battery identical to the battery in the nth charge-discharge cycle, or $I_n$ can be a preset value, n is an integer and is greater than or equal to 0, and m is an integer greater than n, the value of k is not the same in at least two charge-discharge cycles of the battery.

19 Claims, 7 Drawing Sheets

CHARGING METHOD FOR A BATTERY, AND AN ELECTRONIC DEVICE USING THE CHARGING METHOD

CROSS-REFERENCE TO RELATED APPLICATIONS

This application is a continuation-in-part of International Patent Application No. PCT/CN2019/112385, filed on Oct. 21, 2019, the contents of which are incorporated by reference herein.

Field

The subject matter herein generally relates to battery technology, especially relates to a charging method, and an electronic device using the charging method.

BACKGROUND

In the prior art, charging method used in lithium-ion batteries includes continuously charging the battery to a certain voltage (the charging limit voltage) with a preset constant current, and the certain voltage is then used to charge the battery to a full charge state. In this case, with more battery charging cycles and time of usage, the battery will age and the battery's impedance will increase. The increase of the battery's impedance will lead to increased charging polarization, causing the constant current charging stage of a cut-off point to occur more quickly, which will make the battery's constant current charging time shorter and extend the constant voltage charging time. Thus, the total charging time of the battery becomes much longer.

SUMMARY

A charging method for a battery is illustrated. The charging method includes charging the battery with a first charge current at constant current in a mth charge-discharge cycle of the battery, wherein the battery has a first cut-off voltage when a constant current charging stage of the battery is cut off in the mth charge-discharge cycle. The first charge current is calculated according to a formula $I_m = I_n + k \times I_n$, $I_m$ is the first charge current, $0 < k \leq 1$, $I_n$ is the charging current at the constant current charging stage of the battery or another battery identical to the battery in the nth charge-discharge cycle, or $I_n$ is a preset value, n is an integer and is greater than or equal to 0, m is any two or more integers of 1, 2, 3, . . . , and m is an integer greater than n, the value of k is not the same in at least two charge-discharge cycles of the battery. The method can shorten a charging time at a constant voltage charging stage of the battery, which in turn can shorten the total charging time of the battery, and the time when the cathode of the battery is in the high potential stage, thereby improving the cycle life of the battery.

An electronic device includes a battery and a processor used to implement a charging method to charge the battery. The charging method includes the method described above.

A non-transitory storage medium has stored instructions of a charging method for a battery thereon, the instructions are loaded and executed to charge the battery by a processor. The charging method includes the method described above.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Exemplary embodiments of the present disclosure will be described in relation to the accompanying drawings. SOC is an abbreviation of state of charge described as below.

Figure 1:
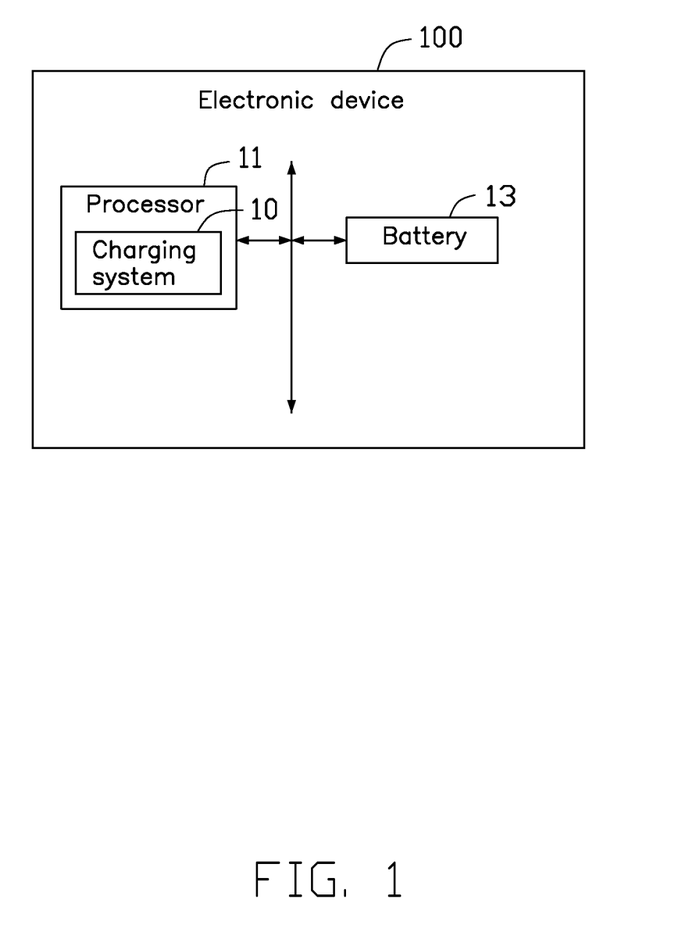
FIG. 1 is a block diagram of one embodiment of an electronic device.

FIG. 1 illustrates an embodiment of an electronic device 100. A charging system 10 is applied in the electronic device 100. The electronic device 100 includes, but is not limited to a processor 11 and a battery 13. The processor 11 connects to the battery 13 by a bus. In another embodiment, the processor 11 directly connects to the battery 13.

It should be noted that the FIG. 1 is an example of an electronic device (electronic device 100). In other embodiment, the electronic device may also include more or fewer components, or have different component configurations. For example, the electronic device may be an electric motorcycle, an electric bicycle, an electric vehicle, a mobile phone, a tablet computer, a digital assistant, a personal computer, or any other suitable rechargeable device.

In one embodiment, the battery 13 is to be charged and used to provide electrical energy to the electronic device 100. For example, the battery 13 may be a lead-acid battery, a nickel-cadmium battery, a nickel-hydrogen battery, a lithium-ion battery, a lithium-polymer battery and a lithium iron phosphate battery, and so on. In one embodiment, the battery 13 has a logic connection to the processor 11 by the charging system 10, thereby realizing functions of charging, discharging and power management through the charging system 10. In one embodiment, the battery 13 includes an cell (not shown).

Figure 2:
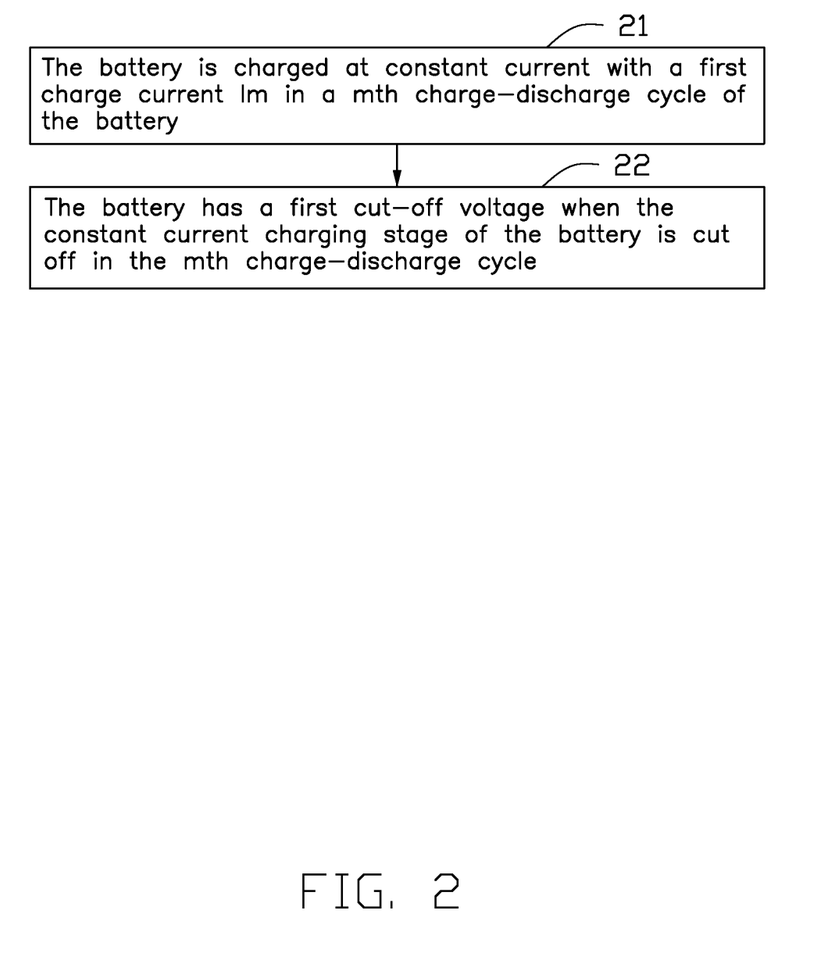
FIG. 2 illustrates a flowchart of one embodiment of a charging method for a battery in FIG. 1.

FIG. 2 illustrates a flowchart of one embodiment of a charging method for a battery. The charging method is provided by way of example, as there are a variety of ways to carry out the method. The method described below can be carried out using the configurations illustrated in FIG. 1, for example, and various elements of these figures are referenced in explaining the exemplary method. Each step shown in FIG. 2 represents one or more processes, methods, or subroutines carried out in the exemplary method. Furthermore, the illustrated order of steps is by example only and the order of the steps can be changed. Additional steps may be added or fewer steps may be utilized, without departing from this disclosure. The exemplary method can begin at step 21.

At step 21: the battery 13 is charged at constant current with a first charge current $I_m$ in a mth charge-discharge cycle of the battery 13.

In one embodiment, m is any two or more integers of 1, 2, 3, . . . , $I_m$ are not the same in at least two charge-discharge cycles, that is, $I_m$ may vary with the number of charge-discharge cycles.

In one embodiment, the charging system 10 uses the first charging current $I_m$ to charge the battery 13 by a constant current. The first charging current $I_m$ is the charging current at the constant current charging stage of the battery 13 in the mth charge-discharge cycle. In one embodiment, the first charge current $I_m$ is calculated according to a formula $I_m=I_n+k\times I_n$, wherein $0<k\le 1$, a value of k may vary with the number of charge-discharge cycles. That is, in different charge-discharge cycles, the value of k may be different, and the first charging current $I_m$ is not the same, or, in different charge-discharge cycles, the first charging current $I_m$ may be the same, or may be not the same. $I_n$ is the charging current at the constant current charging stage of the battery 13 or another battery identical to the battery in the nth charge-discharge cycle. In one embodiment, $I_n$ may be a preset value.

In one embodiment, n is an integer and is greater than or equal to 0, and m is an integer greater than n. In one embodiment, the value of k is not the same in at least two charge-discharge cycles. In one embodiment, k is calculated according to a formula $k=k_1\times m+k_2$, wherein $0\le k_1\le 0.001$, $0\le k_2\le 0.2$. In formula $k=k_1\times m+k_2$, the value of k may vary with the number of charge-discharge cycles, namely, in different charge-discharge cycles, the value of k may be same or different.

At step 22: the battery 13 has a first cut-off voltage $V_1$ when the constant current charging stage of the battery 13 is cut off in the mth charge-discharge cycle.

In one embodiment, the first cut-off voltage $V_1$ is calculated according to formula $V_1=V_2+b$, wherein $0\le b\le 0.5$, $V_2$ is a second cut-off voltage. In one embodiment, $V_2$ is the cut-off voltage when the constant current charging stage of the battery 13 or another battery identical to the battery 13 (i.e. the same model) is cut off in the nth charge-discharge cycle. In another embodiment, $V_2$ is a charging limit voltage of the battery 13 or a preset value, the value of b is not the same in at least two charge-discharge cycles of the battery 13, that is, in at least two charge-discharge cycles, the first cut-off voltage $V_1$ is not the same, and $V_1$ may vary with the number of charge-discharge cycles. In other embodiments, the value of $V_1$ is same in different charge-discharge cycles.

In one embodiment, b is calculated according to a formula $b=b_1\times m+b_2$, wherein $0\le b_1\le 0.0005$, $0\le b_2\le 0.1$. In formula $b=b_1\times m+b_2$, the value of b may vary with the number of charge-discharge cycles, namely, in different charge-discharge cycles, the value of b may be same or different.

Figure 3:
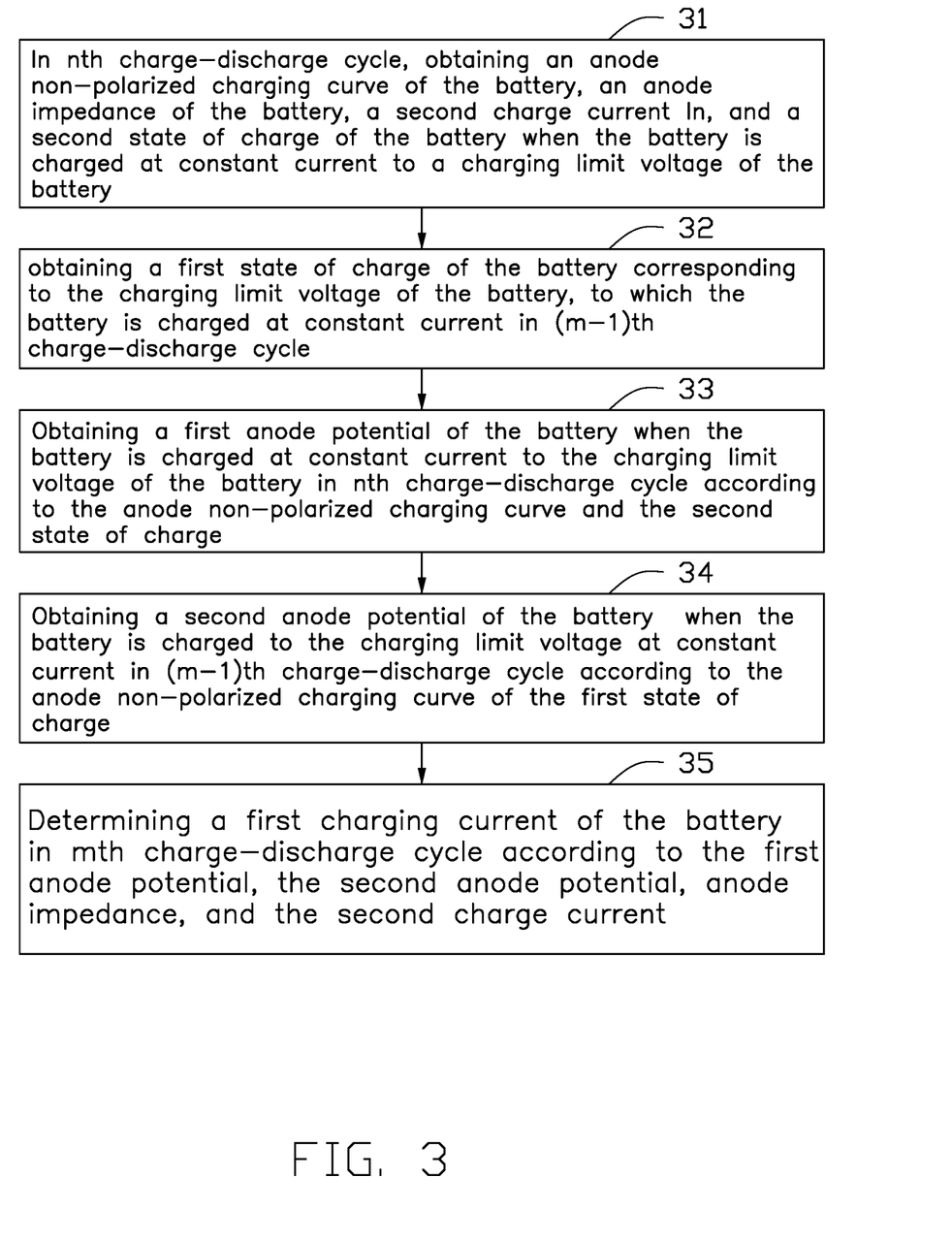
FIG. 3 illustrates a flowchart of another embodiment of a charging method for the battery.

FIG. 3 illustrates a method for the charging system 10 determining a first charge current $I_m$ in the mth charge-discharge cycle. The exemplary method may begin at step 31.

At step 31: in nth charge-discharge cycle, obtaining an anode non-polarized charging curve of the battery 13, an anode impedance of the battery 13, a second charge current $I_n$, and a second state of charge $SOC_2$ of the battery 13 when the battery 13 is charged at constant current to a voltage $U_{cl}$ of the battery 13.

In one embodiment, $U_{cl}$ is a charging limit voltage of the battery 13 or another battery identical to the battery 13. It can be understood that the charging limit voltage may refer to the charging limit voltage described in the background art, or written on a battery product information. In one embodiment, the value of $U_{cl}$ is 4.45V, or other values.

In one embodiment, the charging system 10 utilizes the second charging current $I_n$ to charge the battery 13 at constant current. The second charging current $I_n$ is the charge current at the constant current charging stage of the battery 13 in the nth charge-discharge cycle. The charging system 10 stores the anode non-polarized charging curve of the battery 12, the anode impedance of the battery 13, the second charge current $I_n$ of the battery 13 and the second state of charge $SOC_2$ of the battery 13 when the battery 12 is charged at constant current to the voltage $U_{cl}$ of the battery 13. In one embodiment, the anode non-polarized charging curve indicates a mapping relationship between a state of charge (SOC) and an anode potential corresponding to SOC when the battery 13 is charged with a small charge rate. For example, the small charge rate may be 0.01C.

In one embodiment, the anode impedance $R_a$ in the nth charge-discharge cycle may be obtained by impedance test or may be pre-stored.

At step 32: obtaining a first state of charge $SOC_1$ of the battery 13 corresponding to the voltage $U_{cl}$ of the battery 13, to which the battery 13 is charged at constant current in (m−1)th charge-discharge cycle.

In one embodiment, the charging system 10 obtains the first state of charge $SOC_1$ of the battery 13 corresponding to the voltage $U_{cl}$ of the battery 13, to which the battery 13 is charged at constant current in (m−1)th charge-discharge cycle.

At step 33: obtaining a first anode potential $U_n$ of the battery 13 when the battery 13 is charged at constant current to the voltage $U_{cl}$ of the battery 13 in nth charge-discharge cycle according to the anode non-polarized charging curve and the second state of charge $SOC_2$.

In one embodiment, the charging system 10 obtains the first anode potential $U_n$ of the battery 13 when the battery 13 is charged at constant current to the voltage $U_{cl}$ of the battery 13 in nth charge-discharge cycle according to the anode non-polarized charging curve and the second state of charge $SOC_2$.

At step 34: obtaining a second anode potential $U_{m-1}$ of the battery 13 when the battery 13 is charged to the voltage $U_{cl}$ at constant current in (m−1)th charge-discharge cycle according to the anode non-polarized charging curve of the first state of charge $SOC_1$.

In one embodiment, the charging system 10 obtains the second anode potential corresponding $U_{m-1}$ corresponding to the Voltage $U_{cl}$ of the battery 13, to which the battery 13 is charged at constant current in (m−1)th charge-discharge cycle according to the anode non-polarized charging curve and the first state of charge $SOC_1$.

At step 35: determining a first charging current $I_m$ of the battery 13 in mth charge-discharge cycle according to the first anode potential $U_n$, the second anode potential $U_{m-1}$, anode impedance $R_a$, and the second charge current $I_n$.

In one embodiment, the charging system 10 determines the first charging current $I_m$ of the battery 13 in the mth charge-discharge cycle according to the first anode potential $U_n$, the second anode potential $U_{m-1}$, the anode impedance $R_a$, and the second charge current $I_n$, and charges the battery 13 with the first charging current $I_m$. In one embodiment, the anode impedance $R_a$ may be measured by three electrodes and may be pre-stored in a memory or a processor.

In one embodiment, the first charging current $I_m$ may be calculated according to a formula $I_m = I_n + (U_{m-1} - U_n)/R_a$ (i.e. $k \times I_n = (U_{m-1} - U_n)/R_a$). In one embodiment, m is an integer greater than 1. The charging system 10 may obtain the first charging current $I_m$ according to the formula $I_m = I_n + (U_{m-1} - U_n)/R_a$, and charges the battery 13 with the first charging current $I_m$.

Figure 4:
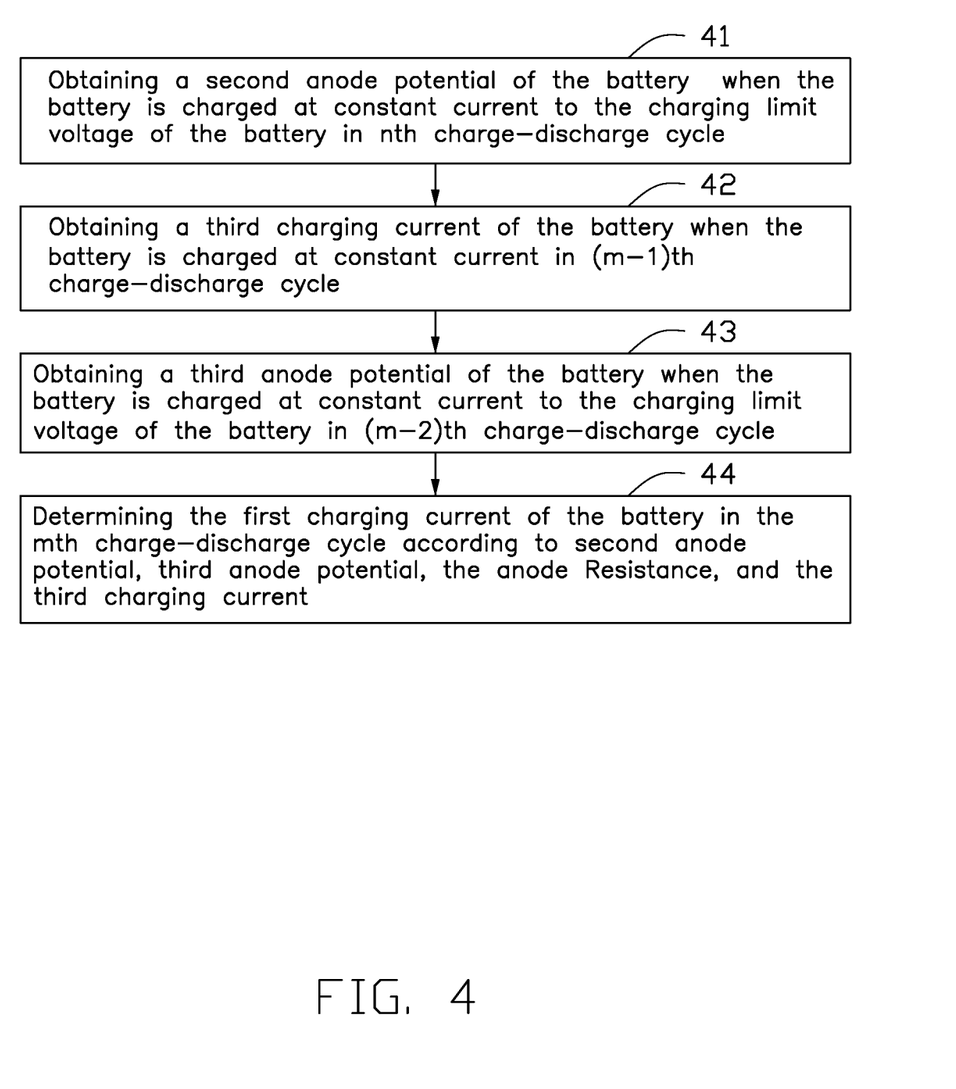
FIG. 4 illustrates a flowchart of another embodiment of a charging method for the battery.

FIG. 4 illustrates another embodiment of the method for the charging system 10 in determining a first charge current $I_m$ in the mth charge-discharge cycle. In one embodiment, the charging system 10 sets the nth charge-discharge cycle to the m−1 charge-discharge cycle, and the first charging current $I_m$ is obtained accordingly. The exemplary method may begin at step 41.

At step 41: obtaining a second anode potential $U_{m-1}$ of the battery 13 when the battery 13 is charged at constant current to the voltage $U_{cl}$ of the battery 13 in nth charge-discharge cycle.

In one embodiment, the charging system 10 obtains the second anode potential $U_{m-1}$ of the battery 13 when the battery 13 is charged at constant current to the voltage $U_{cl}$ of the battery 13 in (m−1)th charge-discharge cycle.

At step 42: obtaining a third charging current $I_{m-1}$ of the battery 13 when the battery 13 is charged at constant current in (m−1)th charge-discharge cycle.

At step 43: obtaining a third anode potential $U_{m-2}$ of the battery 13 when the battery 13 is charged at constant current to the voltage $U_{cl}$ of the battery 13 in (m−2)th charge-discharge cycle.

At step 44: determining the first charging current $I_m$ of the battery 13 in the mth charge-discharge cycle according to second anode potential $U_{m-1}$, third anode potential $U_{m-2}$, the anode Resistance $R_a$, and the third charging current $I_{m-1}$.

In one embodiment, the charging system 10 obtains the first charging current $I_m$ of the battery 13 according to formula $I_m = I_{m-1} + (U_{m-1} - U_{m-2})/R_a$. In one embodiment, m is an integer greater than 2. In one embodiment, the charging system 10 charges the battery 13 by the first charging current $I_m$.

Figure 5:
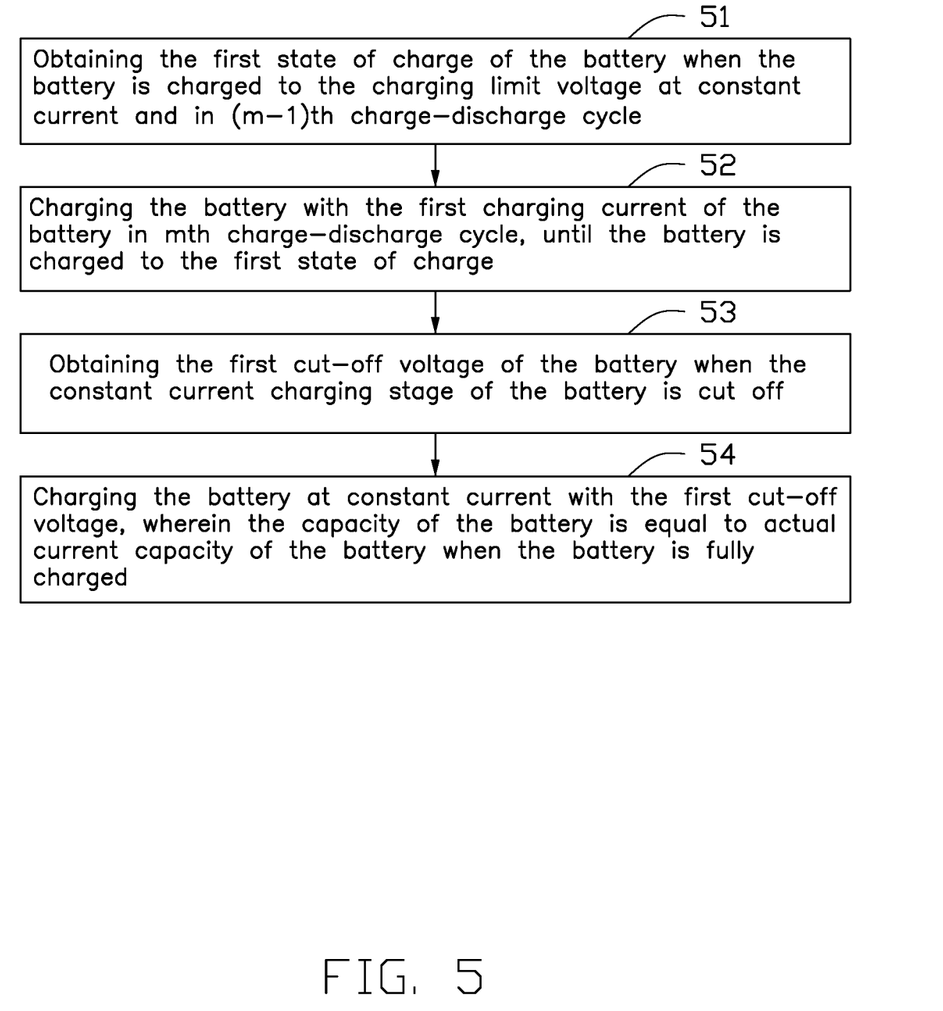
FIG. 5 illustrates a flowchart of another embodiment of a charging method for the battery.

In another embodiment, referred to FIG. 5, the charging system 10 charges the battery 13 with the first charging current $I_m$. The example method may begin at step 51.

At step 51: obtaining the first state of charge $SOC_1$ of the battery 13 when the battery 13 is charged to the voltage $U_{cl}$ at constant current and in (m−1)th charge-discharge cycle.

At step 52: charging the battery 13 with the first charging current $I_m$ of the battery in mth charge-discharge cycle, until the battery 13 is charged to the first state of charge $SOC_1$.

In one embodiment, after obtaining the first charging current $I_m$, the charging system 10 charges the battery 13 with the first charging current $I_m$ at constant current until the state of charge of the battery 13 reaches a first state of charge $SOC_1$.

At step 53: obtaining the first cut-off voltage $V_1$ of the battery 13 when the constant current charging stage of the battery 13 is cut off.

In one embodiment, when the battery 13 is charged to the first state of charge $SOC_1$, the charging system 10 obtains the first cut-off voltage $V_1$ of the battery 13 when the constant current charging stage of the battery 13 is cut off.

At step 54: charging the battery 13 at constant current with the first cut-off voltage $V_1$, wherein the capacity of the battery 13 is equal to actual current capacity Q of the battery 13 when the battery 13 is fully charged.

In one embodiment, when the battery 13 reaches the first state of charge $SOC_1$, the charging system 10 charges the battery 13 at constant current to a fully charged state by the first cut-off voltage $V_1$, meanwhile the full charge capacity of the battery 13 is equal to actual current capacity Q of the battery 13. Namely, a total charging capacity of the battery 13 (i.e. the sum of the charging capacity of the battery at step 52 and step 54) is equal to the discharge capacity of the battery 13 in the (m−1)th charge-discharge cycle.

In one embodiment, the charging system 10 further obtains actual current capacity and discharge capacity of the battery 13 in each charge-discharge cycle. In one embodiment, the current capacity of the battery 13 in each charge-discharge cycle is the actual capacity of the battery 13 in corresponding charge-discharge cycle. Namely, the current capacity of the battery 13 in each charge-discharge cycle is a maximum capacity when the battery 13 is discharged from a fully charged state to a fully discharged state in a corresponding charge-discharge cycle. In one embodiment, the discharge capacity of the battery 13 may be measured by volt-ammeter. In one embodiment, the fully discharged state is a state when the capacity of the battery 13 is zero after the battery 13 is discharged. In another embodiment, the fully discharge state is a state when the battery 13 is discharged to a preset capacity or preset voltage.

In one embodiment, the charging system 10 obtains current capacity of the battery 13 in each charge-discharge cycle, and records a temperature of the battery 13 and a charge-discharge rate of the battery 13. The charging system 10 performs a conversion calculation of the battery's capacity according to a correspondence between different capacities of the battery 13 in different temperatures and different charge-discharge rates, and obtains a maximum capacity of the battery 13 corresponding to current temperature of the capacity 13 and current charge-discharge rate of the battery 13. The maximum capacity of the battery 13 is namely the current capacity of the battery 13.

In detail, the current capacity of the battery 13 varies with the increase in using time of the battery 13 or the number of charge-discharge cycles. The capacity of the battery is directly related to ageing of a cell.

In one embodiment, in the mth charge-discharge cycle, the charging system 10 charges the battery 13 with the first charging current $I_m$ by a constant current to the first cut-off voltage $V_1$, and further charges the battery 13 with the first cut-off voltage by a constant voltage, until the charging capacity of the battery 13 is equal to the discharge capacity of the battery in the (m−1)th charge-discharge cycle, thus, the battery 13 is not overcharged.

Figure 6:
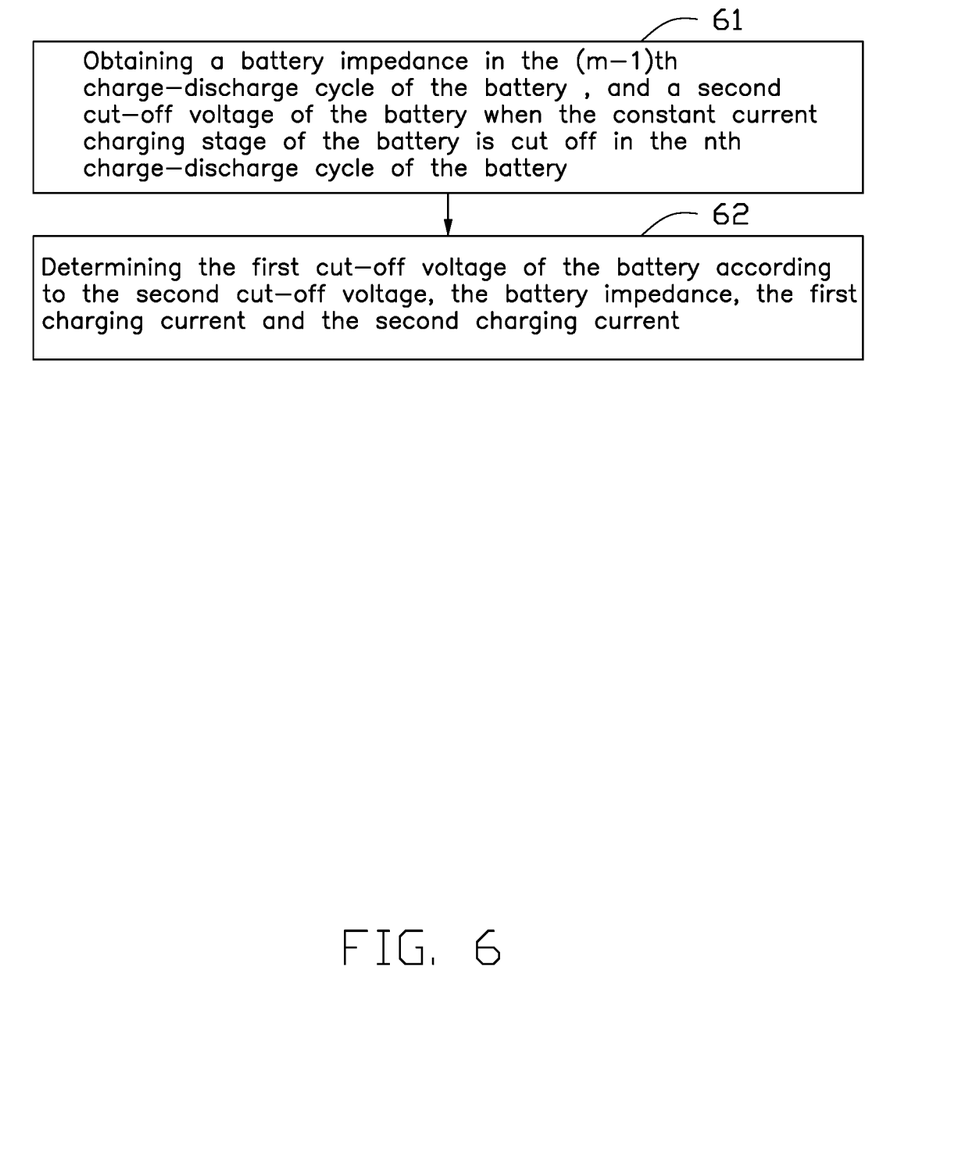
FIG. 6 illustrates a flowchart of another embodiment of a charging method for the battery.

FIG. 6 illustrates a method for the charging system 10 determining the first cut-off voltage $V_1$ of the battery in the mth charge-discharge cycle of the battery. The example method may begin at step 61.

At step 61: obtaining a battery impedance R in the (m−1)th charge-discharge cycle of the battery 13, and a second cut-off voltage $V_2$ of the battery 13 when the constant current charging stage of the battery 13 is cut off in the nth charge-discharge cycle of the battery 13.

In one embodiment, the second cut-off voltage $V_2$ is a voltage when the battery 13 or another battery identical to the battery 13 is charged at the end of the constant current charging stage of the battery 13 in the nth charge-discharge cycle. In another embodiment, the second cut-off voltage $V_2$ is the charging limit voltage $U_{cl}$ of the battery 13 or another battery identical to the battery 13. The second cut-off voltage $V_2$ may also be a preset value. It can be understood that $U_{cl}$ is the charging limit voltage described in the background art, or written on the battery product information. In one embodiment, the value of $U_{cl}$ is 4.45V.

At step 62: determining the first cut-off voltage $V_1$ of the battery 13 according to the second cut-off voltage $V_2$, the battery impedance R, the first charging current $I_m$ and the second charging current $I_n$.

In one embodiment, the charging system 10 calculates the first cut-off voltage $V_1$ of the battery 13 according to a formula $V_1=V_2+R\times(I_m-I_n)$. In one embodiment, R is the battery impedance of the battery 13 at the end of constant current charging stage in the (m−1)th charge-discharge cycle. R is the battery impedance in charging process, or the battery impedance in discharging process. After calculating the first cut-off voltage $V_1$ of the battery 13, the charging system 10 further utilizes the first cut-off voltage $V_1$ to cut off the constant current charging stage of the battery 13 in the mth charge-discharge cycle.

The following, in conjunction with the drawings and embodiments, further describes the details of this application. The battery of the embodiments and the comparative embodiments in the present application includes $LiCoO_2$ as a cathode, graphite as an anode, diaphragm, electrolyte and packaging shell. And the battery is made by a series of processes including mixing, coating, assembly, chemical formation and aging. Part of the cell is joined by reference electrodes between the cathode and the anode to make a three-electrode battery to test the anode non-polarization curve and the anode impedance in charging process. It should be noted that the embodiments of the application may also use batteries of other chemical systems. For example, using other substance, such as lithium manganate, lithium iron phosphate, or cathode materials of battery. It should be noted that the embodiments of the application take the battery's charging limit voltage to 4.45V as an example. This application of charging methods may be applied to a variety of voltage system of batteries, and the voltage system of batteries is not limited to 4.45V. The 4.45V voltage system of battery in comparison examples is tested for cycling performance by using prior charging method (constant current-constant voltage charging method), and the embodiment of the charging method applied for in this application is test for cycling performance, and comparing the charging speed during two charging methods.

Comparison example 1 and comparison example 2 described below illustrate the charging method for the battery 13 using the existing technology.

It should be noted that comparison example 1 discloses the specific implementation of a charging method using an existing technology (i.e. in the constant current charging stage in each charge-discharge cycle, the battery is charged at the same fixed current and cut off at a fixed voltage) by using a fresh or unused battery.

Comparison Example 1

Testing ambient temperature of comparison example 1 is at 25 degrees. Charging process of the comparison example 1 includes: step 1, charging the battery 13 with a constant current 1.5C until the voltage of the battery 13 reaches a cut-off voltage 4.45V (namely a charging limit voltage of the battery 13); step 2, charging the battery 13 with the constant voltage 4.45V until the current of the battery 13 reaches the cut-off current 0.05C; step 3, leaving the battery 13 to rest for 5 minutes; step 4, discharging the battery 13 with a constant current 1.0C until the voltage of the battery 13 is 3.0V; step 5, leaving the battery 13 to rest for 5 minutes again; step 6, repeating the above 5 steps for 500 cycles.

It should be noted that the specific embodiments 1 to 4 of the following statement use the fresh battery to obtain the appropriate parameters, and charge the fresh battery according to the charging method of the present application, while the ambient temperature of the battery 13 in these embodiments during charging process is the same as the ambient temperature of the battery 13 in the comparison example 1 and remains unchanged. The fresh battery refers to a battery that has not been used before leaving the factory, or a battery that the number of charge and discharge cycles after leaving the factory is less than a preset number (such as 10 times, or other times).

Embodiment 1

In embodiment 1, during the charge-discharge cycles of the battery 13, the first charging current $I_m$ changes according to formula: $I_m=I_n+(k_1\times m+k_2)\times I_n$, where, n=1, $I_n$=1.5C, 1≤m≤80, $k_1$=0, $k_2$=0, 81≤m≤500, $k_1$=0.0003, $k_2$=0.

Ambient temperature of the embodiment 1 is at 25 degrees. Charging process of the embodiment 1 includes: step 1, charging the battery 13 with the constant current $I_m$ until the voltage of the battery 13 reaches a cut-off voltage 4.45V, wherein during the charge-discharge cycles of the battery 13, $I_m$ changes according to formula: $I_m=I_n+(k_1\times m+k_2)\times I_n$, where, n=1, $I_n$=1.5C, 1≤m≤80, $k_1$=0, $k_2$=0, 81≤m≤500, $k_1$=0.0003, $k_2$=0; step 2, charging the battery 13 with the constant voltage 4.45V until the current of the battery 13 reaches the cut-off current 0.05C; step 3, leaving the battery 13 to rest for 5 minutes; step 4, discharging the battery 13 with a constant current 1.0C until the voltage of the battery 13 is 3.0V; step 5, leaving the battery 13 to rest for 5 minutes again; step 6, repeating the above 5 steps for 500 cycles (i.e. m increases from 1 to 500).

Embodiment 2

In embodiment 2, during the charge-discharge cycles of the battery 13, the first charging current $I_m$ changes according to formula: $I_m=I_n+(k_1\times m+k_2)\times I_n$, where, n=1, $I_n$=1.5C, 1≤m≤80, $k_1$=0, $k_2$=0, 81≤m≤500, $k_1$=0.0003, $k_2$=0.

The determining process of the first state of charge $SOC_1$ of the battery 13 when the battery 13 is charged in mth charge-discharge cycle includes: step 1, discharging the battery 13 with a constant current 1.0C until the voltage of the battery 13 is 3.0V; step 2, leaving the battery 13 to rest for 5 minutes: step 3, charging the battery 13 with the constant current 1.5C until the voltage of the battery 13 reaches the cut-off voltage 4.45V; step 4, charging the battery 13 at a constant voltage 4.45V until the current of the battery 13 reaches the cut-off current 0.05C; step 5, leaving the battery 13 to rest for 5 minutes again; step 6, and discharging the battery 13 with a constant current 1.0C until the voltage of the battery 13 is 3.0V; step 7, obtaining a SOC of the battery 13 when the battery 13 stops charging at constant current in step 3 and step 4, which is recorded as $SOC_1$, and obtaining an actual capacity Q of the battery 13 by discharging capacity in step 6.

The ambient temperature of the battery 13 in embodiment 2 is at 25 degrees. The charging process of the battery 13 includes: step 1, obtaining the current capacity Q of the battery 13; step 2, charging the battery 13 with the constant current of $I_m$ until the state of charge of the battery 13 reaches $SOC_1$ and obtain a voltage U corresponding to the state of charge of $SOC_1$, where $I_m$ varies with the number of cycles m according to a pre-set formula; step 3, charging the battery 13 at a constant voltage U until the total capacity of the battery 13 is Q; step 4, obtaining SOC of the battery 13 when the voltage of the battery 13 is $U_{cl}$ (e.g. 4.45V), and regarding the SOC of the battery 13 as $SOC_1$ for the battery's charging of the next cycle; step 5, leaving the battery 13 to rest for 5 minutes; step 6, discharging the battery 13 with a constant current of 1.0C until the voltage of the battery 13 is 3.0V; step 7, obtaining the discharging capacity of the battery 13 in step 6 to get the actual capacity Q of the battery 13; step 8, repeating steps 2 to 7 in 500 charge-discharge cycles (i.e. m increases from 1 to 500).

Embodiment 3

In embodiment 3, during the charge-discharge cycles of the battery 13, the first charging current $I_m$ changes according to formula: $I_m=I_n+(k_1 \times m+k_2) \times I_n$, where, n=1, $I_n$=1.5C, 1≤m≤80, $k_1$=0, $k_2$=0, $k_1$=0.0003, $k_2$=0; 81≤m≤500, $k_1$=0.0003, $k_2$=0.

In embodiment 3, the charging system 10 calculates the first cut-off voltage $V_1$ of the battery 13 according to formula $V_1=V_2+b_1 \times m+b_2$, where n=1, $V_2$=4.45V, 1≤m≤80, $b_1$=0, $b_2$=0; 81≤m≤500, $b_1$=0.00004, and $b_2$=0.

The ambient temperature of the battery 13 in embodiment 3 is at 25 degrees. The charging process of the battery 13 in embodiment 3 is identical with the charging process of the battery 13 in embodiment 1, except that the first cut-off voltage $V_1$ is calculated by the formula $V_1=V_2+b_1 \times m+b_2$ in embodiment 3.

Embodiment 4

In embodiment 4, during the charge-discharge cycles of the battery 13, the first charging current $I_m$ changes according to formula: $I_m=I_n+(U_{m-1}-U_1)/R_a$, where, n=1, m>n, $I_n$=1.5C, $U_1$=0.09V, $R_a$ is the anode impedance of the battery 13 in the first charge cycle, the value of $R_a$ is 30 mOhm, $U_1$ is the anode potential of the battery 13 when the battery 13 is charged at constant current to voltage $U_{cl}$ in the first charge-discharge cycle, $U_{m-1}$ is the anode potential of the battery 13 when the battery 13 is charged at constant current to voltage $U_{cl}$ in the (m−1)th charge-discharge cycle. $U_{m-1}$ needs to be extracted in real time according to the first state of charge SOC of the battery 13 when the constant charging stage of the battery 13 charged in (m−1)th charge-discharge cycle is finished, and a correspondence found between the pre-stored anode potential of the battery 13 and the SOC of the battery 13.

The determining process of the first state of charge $SOC_1$ of the battery 13 in embodiment 4 is identical with the determining process of the first state of charge $SOC_1$ of the battery 13 in embodiment 2.

The charging process of the battery 13 in embodiment 4 is identical with the charging process of the battery 13 in embodiment 2, except that the first cut-off voltage $V_1$ and the first state of charge $SOC_1$ is calculated by embodiment 4.

Embodiment 5

In embodiment 5, during the charge-discharge cycles of the battery 13, the first charging current $I_m$ changes according to formula: $I_m=I_n+(U_{m-1}-U_1)/R_a$.

In embodiment 5, the charging system 10 calculates the first cut-off voltage $V_1$ of the battery 13 according to formula $V_1=V_2+(I_m-I_n) \times R$, where n=1, $I_1$=1.5C, $V_2$=4.45V, R is impedance of the battery 13 when the constant charging stage of the battery 13 charged in (m−1)th charge-discharge cycles is finished.

The ambient temperature of the battery 13 in embodiment 5 is at 25 degrees. The charging process of the battery 13 in embodiment 5 includes: step 1, obtaining the current capacity Q of the battery 13; step 2, charging the battery 13 with the constant current of $I_m$ until the voltage of the battery 13 reaches the cut-off voltage $V_1$ and obtaining an impedance R of the battery 13 when the constant charging stage of the battery 13 is finished, where $I_m$ and $V_1$ varies with the number of charge-discharge cycles m according to pre-set formulas; step 3, charging the battery 13 with voltage $V_1$ at a constant voltage until the total capacity of the battery 13 is Q; step 4, leaving the battery 13 to rest for 5 minutes; step 5, discharging the battery 13 with a constant current of 1.0C until the voltage of the battery 13 is 3.0V; step 6, repeating steps 2 to 5 in 500 charge-discharge cycles (i.e. m increases from 1 to 500).

Comparison Example 2

It should be noted that comparison example 2 discloses an implementation of the charging method of the existing technology using a battery, having 100 charging-discharging cycles.

Ambient temperature of the battery 13 in comparison example 2 is at 25 degrees. The charging process of the comparison example 2 is identical with the charging process of the comparison example 1, except for the battery, of which the charging-discharging cycles are 100 times. It should be noted that the embodiments 6 to 10 utilize fresh battery to obtain the corresponding parameters of the fresh battery, embodiment 11 utilizes the battery that has been cycled 100 times to obtain the corresponding parameters of the battery. Embodiments 6 to 11 disclose the specific implementation process of the charging method using the battery that has been cycled 100 times, and the ambient temperature of the embodiments 6 to 11 during the battery's charging process is the same as the ambient temperature of the comparison example 2 and remains the same.

Embodiment 6

In embodiment 6, during the charge-discharge cycles of the battery 13, the first charging current $I_m$ changes according to formula: $I_m=I_n+(k_1\times m+k_2)\times I_n$, where n=1, $I_n$=1.5C, 101≤m≤500, $k_1$=0.0003, $k_2$=0. The charging process of the battery 13 in embodiment 6 is identical with the charging process of the battery 13 in embodiment 1, except for the first charging current $I_m$ calculated by the formula $I_m=I_n+(k_1\times m+k_2)\times I_n$, where 101≤m≤500.

Embodiment 7

In embodiment 7, during the charge-discharge cycles of the battery 13, the first charging current $I_m$ changes according to formula $I_m=I_n+(k_1\times m+k_2)\times I_n$, where n=1, $I_n$=1.5C, 101≤m≤500, $k_1$=0.0003, $k_2$=0.

The determining process of the first state of charge $SOC_1$ of the battery 13 charged in mth charge-discharge cycle in embodiment 7 is identical with the determining process of the first state of charge $SOC_1$ of the battery 13 in embodiment 2, except for utilizing a battery that has been cycled 100 times.

The charging process of the battery 13 in embodiment 7 is identical with the charging process of the battery 13 in embodiment 1, except that $I_m$ is calculated according to formula $I_m=I_n+(k_1\times m+k_2)\times I_n$, where 101≤m≤500.

Embodiment 8

During the charge-discharge cycles of the battery 13, the first charging current $I_m$ of embodiment 8 changes according to formula $I_m=I_n+(k_1\times m+k_2)\times I_n$, where n=1, $I_n$=1.5C, 101≤m≤500, $k_1$=0.0003, $k_2$=0.

The charging system 10 calculates the first cut-off voltage $V_1$ of the battery 13 according to formula $V_1=V_2+b_1\times m+b_2$, where n=1, $V_2$=4.45V, 101≤m≤500, $b_1$=0.00004, and $b_2$=0.

The charging process of the battery 13 in embodiment 8 is identical with the charging process of the battery 13 in embodiment 3, except that the first charging current m is calculated according to formula $I_m=I_n+(k_1\times m+k_2)\times I_n$, and the first cut-off voltage $V_1$ is calculated according to formula $V_1=V_2+b_1\times m+b_2$, where 101≤m≤500.

Embodiment 9

$I_n$ embodiment 9, during the charge-discharge cycles of the battery 13, the first charging current $I_m$ changes according to formula: $I_m=I_n+(U_{m-1}-U_1)/R_a$, where, n=1, m>n, $I_n$=1.5C, $U_1$=0.09V, $R_a$ is the anode impedance of the battery 13 in the first charge cycle, the value of $R_a$ is 30 mOhm, $U_1$ is the anode potential of the battery 13 when the battery 13 is charged at constant current to voltage $U_{cl}$ in the first charge-discharge cycle, and $U_{m-1}$ is the anode potential of the battery 13 when the battery 13 is charged at constant current to voltage $U_{cl}$ in the (m−1)th charge-discharge cycle. $U_{m-1}$ needs to be extracted in real time according to the first state of charge SOC of the battery 13 when the constant charging stage of the battery 13 charged in (m−1)th charge-discharge cycle terminates, and a correspondence found between the pre-stored anode potential of the battery 13 and the SOC of the battery 13.

The determining process of the first state of charge $SOC_1$ of the battery 13 in embodiment 9 is identical with the determining process of the first state of charge $SOC_1$ of the battery 13 in embodiment 2, except for utilizing a battery that has been cycled 100 times.

The charging process of the battery 13 in embodiment 9 is identical with the charging process of the battery 13 in embodiment 2, except that the $I_m$ is calculated according to formula $I_m=I_n+(U_{m-1}-U_1)/R_a$, and the first state of charge $SOC_1$ of the battery 13, where 101≤m≤500.

Embodiment 10

In embodiment 10, during the charge-discharge cycles of the battery 13, the first charging current $I_m$ changes according to formula: $I_m=I_n+(U_{m-1}-U_1)/R_a$ (i.e. same with embodiment 9).

The charging system 10 calculates the first cut-off voltage $V_1$ of the battery 13 according to formula $V_1=V_2+(I_m-I_n)\times R$, where n=1, $I_1$=1.5C, $V_2$=4.45V, R is an impedance of the battery 13 when the constant charging stage of the battery 13 charged in (m−1)th charge-discharge cycle terminates.

The charging process of the battery 13 in embodiment 10 is identical with the charging process of the battery 13 in embodiment 5, except that the first charging current $I_m$ is calculated according to formula $I_m=I_n+(U_{m-1}-U)/R_a$, and the first cut-off voltage $V_1$ is calculated according to formula $V_1=V_2+(I_m-I_n)\times R$, 101≤m≤500.

Embodiment 11

In embodiment 11, during the charge-discharge cycles of the battery 13, the first charging current $I_m$ changes according to formula: $I_m=I_n+(U_{m-1}-U_1)/R_a$, where, n=100, m>n, $I_n$=0.5C, $U_{100}$=0.09V, $U_{100}$ is the anode potential of the battery 13 when the battery 13 is charged at constant current to voltage $U_{cl}$ in the 100th charge-discharge cycle, $U_{m-1}$ is the anode potential of the battery 13 when the battery 13 is charged at constant current to voltage $U_{cl}$ in the (m−1)th charge-discharge cycle, $R_a$ is the anode impedance of the battery 13 in the first charge cycle, the value of $R_a$ is 30 mOhm, and the anode impedance $R_a$ remains unchanged during battery's charge-discharge cycle.

The charging system 10 calculates the first cut-off voltage $V_1$ of the battery 13 according to formula $V_1=V_2+(I_m-I_n)\times R$, where n=1, $I_1$=1.5C, $V_2$=4.45V, R is impedance of the battery 13 when the constant charging stage of the battery 13 charged in (m−1)th charge-discharge cycle terminates.

The charging process of the battery 13 in embodiment 11 is identical with the charging process of the battery 13 in embodiment 5, except that the first charging current $I_m$ is calculated according to formula $I_m=I_n+(U_{m-1}-U_1)/R_a$, and the first cut-off voltage $V_1$ is calculated according to formula $V_1=V_2+(I_m-I_n)\times R$, 101≤m≤500.

During the experiment, the parameters (e.g. voltage, current, state of charge, charging time, etc.) of each comparison example and embodiment in different charging stages are recorded in Table 1 below. The Table T1 includes different cut-off conditions of constant current stages, and charging time of charge stages of different comparison examples and embodiments.

TABLE 1

| | Value of n | Value of m | Constant current stage | | | Charging time of constant current stage/min | Charging time of constant voltage stage/min | Total charging time/min |
|---|---|---|---|---|---|---|---|---|
| | | | current | $V_1$ | $SOC_1$ | | | |
| Comparison example 1 | 1 | 2 | 1.5 C | 4.45 V | 70.6% | 27.7 | 53.6 | 81.3 |
| | 1 | 100 | 1.5 C | 4.45 V | 68.7% | 26.2 | 57.3 | 83.5 |
| | 1 | 200 | 1.5 C | 4.45 V | 66.0% | 24.7 | 60.3 | 85.0 |
| | 1 | 500 | 1.5 C | 4.45 V | 62.9% | 22.5 | 64.2 | 86.7 |
| Embodiment 1 | 1 | 2 | 1.5 C | 4.45 V | 70.6% | 27.7 | 53.6 | 81.3 |
| | 1 | 100 | 1.545 C | 4.45 V | 67.9% | 25.1 | 56.8 | 81.9 |
| | 1 | 200 | 1.59 C | 4.45 V | 64.70% | 22.8 | 58.3 | 81.1 |
| | 1 | 500 | 1.725 C | 4.45 V | 61.60% | 18.5 | 62.2 | 80.7 |
| Embodiment 2 | 1 | 2 | 1.5 C | 4.45 V | 70.6% | 27.7 | 53.6 | 81.3 |
| | 1 | 100 | 1.545 C | 4.453 V | 68.7% | 25.4 | 54.5 | 79.9 |
| | 1 | 200 | 1.59 C | 4.459 V | 66.0% | 23.3 | 55 | 78.3 |
| | 1 | 500 | 1.725 C | 4.468 V | 62.9% | 18.9 | 56.5 | 75.4 |
| Embodiment 3 | 1 | 2 | 1.5 C | 4.45 V | 70.6% | 27.7 | 53.6 | 81.3 |
| | 1 | 100 | 1.545 C | 4.454 V | 68.9% | 25.5 | 54.2 | 79.7 |
| | 1 | 200 | 1.59 C | 4.458 V | 65.9% | 23.2 | 55.3 | 78.5 |
| | 1 | 500 | 1.725 C | 4.47 V | 63.1% | 19.1 | 55.9 | 75 |
| Embodiment 4 | 1 | 2 | 1.5 C | 4.45 V | 70.6% | 27.7 | 53.6 | 81.3 |
| | 1 | 100 | 1.54 C | 4.452 V | 68.7% | 25.4 | 54.8 | 80.2 |
| | 1 | 200 | 1.60 C | 4.46 V | 66.2% | 23.4 | 55.0 | 78.4 |
| | 1 | 500 | 1.74 C | 4.471 V | 63.4% | 19.2 | 55.4 | 74.6 |
| Embodiment 5 | 1 | 2 | 1.5 C | 4.45 V | 70.6% | 27.7 | 53.6 | 81.3 |
| | 1 | 100 | 1.54 C | 4.454 V | 69.0% | 25.5 | 54.7 | 80.2 |
| | 1 | 200 | 1.60 C | 4.458 V | 65.8% | 23.2 | 55.4 | 78.6 |
| | 1 | 500 | 1.74 C | 4.47 V | 62.9% | 19.0 | 56.0 | 75 |
| Embodiment 2 | 100 | 102 | 1.5 C | 4.45 V | 68.7% | 26.2 | 57.3 | 83.5 |
| | 100 | 200 | 1.5 C | 4.45 V | 66.0% | 24.7 | 60.3 | 85.0 |
| | 100 | 300 | 1.5 C | 4.45 V | 64.5% | 23.2 | 62.4 | 85.6 |
| | 100 | 500 | 1.5 C | 4.45 V | 62.9% | 22.5 | 64.2 | 86.7 |
| Embodiment 6 | 100 | 102 | 1.545 C | 4.45 V | 67.9% | 25.1 | 56.8 | 81.9 |
| | 100 | 200 | 1.59 C | 4.45 V | 64.70% | 22.8 | 58.3 | 81.1 |
| | 100 | 300 | 1.635 C | 4.45 V | 63.2% | 20.2 | 60.7 | 80.9 |
| | 100 | 500 | 1.725 C | 4.45 V | 61.60% | 18.5 | 62.2 | 80.7 |
| Embodiment 7 | 100 | 102 | 1.545 C | 4.453 V | 68.7% | 25.4 | 54.5 | 79.9 |
| | 100 | 200 | 1.59 C | 4.459 V | 66.0% | 23.3 | 55 | 78.3 |
| | 100 | 300 | 1.635 C | 4.463 V | 64.5% | 21.2 | 55.4 | 76.6 |
| | 100 | 500 | 1.725 C | 4.468 V | 62.9% | 18.9 | 56.5 | 75.4 |
| Embodiment 8 | 100 | 102 | 1.545 C | 4.454 V | 68.9% | 25.5 | 54.2 | 79.7 |
| | 100 | 200 | 1.59 C | 4.458 V | 65.9% | 23.2 | 55.3 | 78.5 |
| | 100 | 300 | 1.635 C | 4.462 V | 64.4% | 21.1 | 55.7 | 76.8 |
| | 100 | 500 | 1.725 C | 4.47 V | 63.1% | 19.1 | 55.9 | 75 |
| Embodiment 9 | 100 | 102 | 1.54 C | 4.452 V | 68.7% | 25.4 | 54.8 | 80.2 |
| | 100 | 200 | 1.60 C | 4.46 V | 66.2% | 23.4 | 55.0 | 78.4 |
| | 100 | 300 | 1.64 C | 4.464 V | 64.5% | 21.0 | 55.1 | 76.1 |
| | 100 | 500 | 1.74 C | 4.471 V | 63.4% | 19.2 | 55.4 | 74.6 |
| Embodiment 10 | 100 | 102 | 1.54 C | 4.454 V | 69.0% | 25.5 | 54.7 | 80.2 |
| | 100 | 200 | 1.60 C | 4.458 V | 65.8% | 23.2 | 55.4 | 78.6 |
| | 100 | 300 | 1.64 C | 4.462 V | 64.3% | 20.9 | 55.7 | 76.6 |
| | 100 | 500 | 1.74 C | 4.47 V | 62.9% | 19.0 | 56.0 | 75 |
| Embodiment 11 | 100 | 102 | 1.54 C | 4.454 V | 69.0% | 25.5 | 54.7 | 80.2 |
| | 100 | 200 | 1.60 C | 4.458 V | 65.8% | 23.2 | 55.4 | 78.6 |
| | 100 | 300 | 1.64 C | 4.462 V | 64.3% | 20.9 | 55.7 | 76.6 |
| | 100 | 500 | 1.74 C | 4.47 V | 62.9% | 19.0 | 56.0 | 75 |

Table 1 shows that the charging velocity of the charging method of embodiments 1 to 11 is faster than the charging methods of comparison examples 1 to 2 using the existing technology, namely, the fully charged time of the embodiments 1 to 11 is shorter than the charging methods of comparison examples 1 and 2. In the charging method of comparison examples 1 and 2, with the battery recycling for using, the impedance of the battery 13 will gradually increase, so that the charging time at the constant current stage became shorter (i.e., faster to reach a fixed cut-off voltage or a charging limit voltage), the charging time of the battery 13 at the constant voltage stage is extended, so that the total charging time of the battery 13 is extended. The charging method of the present disclosure reduces the charging time of the battery 13 at the constant current stage by increasing the charging current at the constant current stage of the battery 13, which in turn improves the charging rate of the battery. Further, the charging method of the present disclosure may also reduce the charging time at the constant voltage stage by setting the cut-off condition (voltage or charge state) of the constant current stage, which in turn may further improve the charging rate of the battery 13, thus ensuring that the anode of the battery 13 does not occur lithium precipitation.

In addition, in the charge-discharge cycle of the battery 13, the first charging current $I_m$, the first cut-off voltage $V_1$ or the first state of charge $SOC_1$ may vary with the number of cycles m, that is, when the number of cycles m is different, the $I_m$, the $V_1$ and the $SOC_1$ may be the same, and may also be different.

In one embodiment, by increasing charge current of the battery 13 at the constant current stage, and maintaining the charging capacity of the battery 13 at the constant current stage, the charging method of the present disclosure reduces the charging time of the battery 13 at the constant current stage. In addition, by increasing the cut-off voltage of the battery 13 at the constant current charging stage, the charging time of the constant voltage stage can be shortened, which in turn can shorten the total charging time of the battery 13, and the time that the cathode of the battery 13 is in the high potential stage, thereby improving the cycle life of the battery 13.

Figure 7:
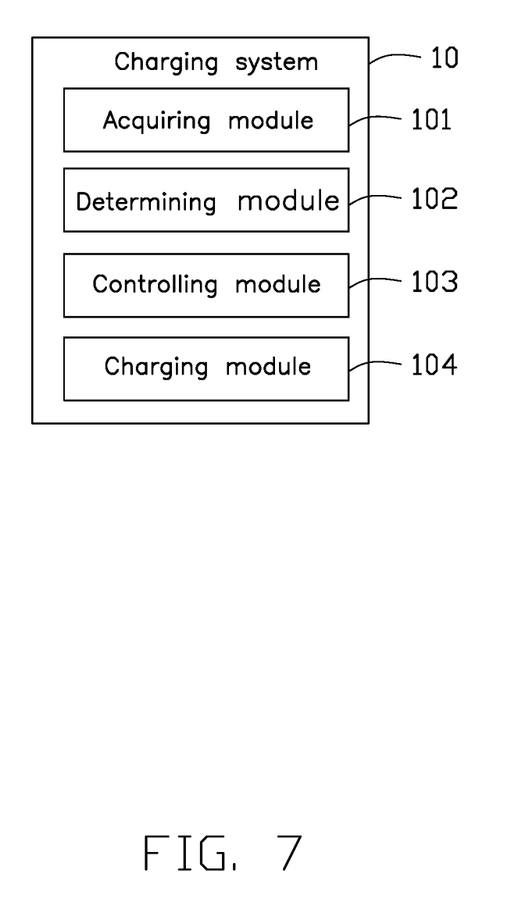
FIG. 7 is a block diagram of an embodiment of an electronic device using the charging battery.

FIG. 7 illustrates the charging system 10. In one embodiment, the charging system 10 may be divided into one or more modules, the one or more modules are stored in a processor 11 of an electronic device 100, and performed by the processor 11 to complete this application. In one embodiment, the one or more modules may be a series of computer program instructions capable of performing a particular function, used to describe the execution process of the charging system 10 in the electronic device 100. For example, the charging system 10 may be divided into an acquiring module 101, a determining module 102, a controlling module 103, a charging module 104.

The acquiring module 101 obtains an anode non-polarized charging curve of the battery 13, an anode impedance of the battery 13, a second state of charge $SOC_2$ of the battery 13 when the battery 13 is charged at constant current to a voltage $U_{cl}$ of the battery 13, and a second charge current $I_n$ when the battery 13 is in nth charge-discharge cycle. The acquiring module 101 further obtains a first anode potential $U_n$ of the battery 13 when the battery 13 is charged at constant current to the voltage $U_{cl}$ of the battery 13 in nth charge-discharge cycle according to the anode non-polarized charging curve and the second state of charge $SOC_2$.

The acquiring module 101 obtains an anode non-polarized charging curve of the battery 13 in (m−1)th charge-discharge cycle, obtains a first state of charge $SOC_1$ of the battery 13 corresponding to the voltage $U_{cl}$ of the battery 13, to which the battery 13 is charged at constant current in (m−1)th charge-discharge cycle, and obtains a second anode potential corresponding $U_{m-1}$ corresponding to the voltage $U_{cl}$ of the battery 13, to which the battery 13 is charged at constant current in (m−1)th charge-discharge cycle according to the anode non-polarized charging curve and the first state of charge $SOC_1$.

The acquiring module 101 obtains a third anode potential $U_{m-2}$ corresponding to the voltage $U_d$ of the battery 13, to which the battery 13 is charged at constant current in (m−2)th charge-discharge cycle.

The acquiring module 101 further obtains a third charging current $I_{m-1}$ of the constant current charge stage of the battery 13 in (m−1)th charge-discharge cycle. The determining module 102 determine the first charging current $I_m$ of the battery 13 in the mth charge-discharge cycle according to the first anode potential $U_n$, the second anode potential $U_{m-1}$, the anode impedance $R_a$, and the second charging current $I_n$.

The determining module 102 further determines the first charging current $I_m$ of the battery 13 in the mth charge-discharge cycle according to the second anode potential $U_{m-1}$, the third anode potential $U_{m-2}$, the anode impedance $R_a$, and the third charge current $I_{m-1}$.

The controlling module 103 charges the battery 13 with the first charging current $I_m$ of the battery 13 in the mth charge-discharge cycle.

The charging module 104 charges the battery 13 at constant current until the voltage of the battery 13 reaches a cut-off voltage or until the battery 13 reaches a charging capacity. The charging module 104 further charges the battery 13 at constant voltage until the battery 13 reaches a corresponding cut-off current, a corresponding cut-off voltage, or a corresponding charging capacity.

By the charging system 10, the battery 13 can be charged and managed to improve the charging efficiency, service life, and reliability of the battery. The details can be found in the embodiments of the charging method of the battery 13 described above.

In one embodiment, the processor 11 may be a central processing unit (CPU), or other general-purpose processors, digital signal processors (DSP), Application Specific Integrated Circuit (ASIC), —Field-Programmable Gate Array (FPGA) or other programmable logic devices, discrete gates or transistor logic devices, discrete hardware components, etc. A universal processor may be a microprocessor, or the processor 12 may be any other conventional processor.

In one embodiment, when the modules/units integrated in the charging system 10 are implemented in the form of software functional units and sold or used as independent products, they can be stored in a non-transitory readable storage medium. Based on this understanding, all or part of the above embodiments of charging method, can also be completed by computer program to instruct the relevant hardware, and the computer program may be stored in a computer readable storage medium, and the computer program is executed by the processor to achieve the above-mentioned charging method in any embodiment. Among them, the computer program includes computer program codes, the computer program code may be a source code form, an object code form, an executable file or some intermediate form.

The computer-readable media may include any entity or device capable of carrying the computer program code, recording media, USB stick, mobile hard disk, disk, CD, computer memory, read-only memory (ROM), random access memory (RAM), electric carrier signals, telecommunications signals, and software distribution media.

Understandably, the module division described above is a logical function division, the actual implementation can have other way of division. In addition, each function module in each embodiment of this application may be integrated into the same processing unit, or the individual modules may be physically present, or two or more modules may be integrated in the same cell. The above integrated module can be implemented in the form of hardware, or in the form of hardware plus software function module.

In another embodiment, the electronic device 100 may also include a storage (not shown in the diagram), one or more modules may also be stored in the storage, and executed by the processor 11. The storage may be the internal memory of the electronic device 100, i.e. the storage built into the electronic device 100. In other embodiments, the storage may also be the external memory of the electronic device 100, that is, the storage attached to the electronic device 100.

In some embodiments, the storage is used to store program code and various data, for example, the storage can store the program code of the charging system 10 installed in the electronic device 100, and allow automatic access during the operation of the electronic device 100.

In one embodiment, the storage may include random access memory, as well as non-volatile memory, such as hard drives, memory, plug-in hard drives, smart media card, secure digital, SD card, Flash Card, at least one disk memory, flash device.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A charging method for a battery, comprising:
charging the battery with a first charge current at a constant current in a mth charge-discharge cycle of the battery, wherein the battery has a first cut-off voltage when a constant current charging stage of the battery is cut off in the mth charge-discharge cycle;
wherein the first charge current is calculated according to a formula $I_m=I_n+k\times I_n$, $I_m$ is the first charge current, $0 \le k \le 1$, $I_n$ is the charging current of the constant current charging stage of the battery or another battery identical to the battery in the nth charge-discharge cycle, or $I_n$ is a preset value, n is an integer and is greater than or equal to 0, and the m is an integer greater than n, the value of k is not the same in at least two charge-discharge cycles of the battery.

2. The method according to claim 1, wherein k is calculated according to a formula $k=k_1 \times m + k_2$, where $0 \le k_1 \le 0.001$, $0 \le k \le 0.2$.

3. The method according to claim 1, wherein $k \times I_n = (U_{m-1}-U_n)/R_a$, m is an integer greater than 1, wherein $U_n$ is a first anode potential of the battery when the battery is charged at constant current to a voltage $U_{cl}$ of the battery in nth charge-discharge cycle, $U_{m-1}$ is a second anode potential of the battery when the battery is charged at constant current to the voltage $U_{cl}$ in (m−1)th charge-discharge cycle, $R_a$ is an anode impedance of the battery when the battery is charged in nth charge-discharge cycle, $U_{cl}$ is a charging limit voltage of the battery or another battery identical to the battery.

4. The method according to claim 1, wherein the first charging current of the battery is calculated according to formula $I_m=I_{m-1}+(U_{m-1}-U_{m-2})/R_a$, m is an integer greater than 2, wherein $U_{m-1}$ is a second anode potential of the battery when the battery is changed at constant current to the voltage $U_{cl}$ in (m−1)th charge-discharge cycle, $R_a$ is an anode impedance of the battery when the battery is charged in nth charge-discharge cycle, $I_{m-1}$ is a third charging current of the battery when the battery is charged at constant current in (m−1)th charge-discharge cycle, $U_{m-2}$ is a third anode potential of the battery when the battery is charged at constant current to the voltage $U_{cl}$ of the battery in (m−2)th charge-discharge cycle, $U_{cl}$ is a charging limit voltage of the battery or another battery identical to the battery.

5. The method according to claim 1 further comprising:
obtaining a first state of charge of the battery when the battery is charged at the constant current to the voltage $U_{cl}$ in (m−1)th charge-discharge cycle; and
charging the battery with the first charging current of the battery in the mth charge-discharge cycle, until the battery is charged to the first state of charge.

6. The method according to claim 1, wherein the first cut-off voltage is calculated according to a formula $V_1=V_2+b$, wherein $V_1$ is the first cut-off voltage, $0 \le b \le 0.5$, $V_2$ is a second cut-off voltage when the constant current charging stage of the battery or another battery identical to the battery is cut off in the nth charge-discharge cycle, or $V_2$ is a charging limit voltage of the battery or a preset value, a value of b is not the same in at least two charge-discharge cycles of the battery.

7. The method according to claim 6, wherein b is calculated according to a formula $b=b_1 \times m + b_2$, where $0 \le b_1 \le 0.0005$, $0 \le b_2 \le 0.1$.

8. The method according to claim 1, wherein determining the first cut-off voltage of the battery comprising:
obtaining a battery impedance in the (m−1)th charge-discharge cycle of the battery;
calculating the first cut-off voltage of the battery according to a formula $V_1=V_2+R\times(I_m-I_n)$, wherein $V_2$ is a second cut-off voltage of the battery when a constant current charging stage of the battery or another battery identical to the battery is cut off in the nth charge-discharge cycle of the battery, R is the battery impedance, $V_1$ is the first cut-off voltage.

9. The method according to claim 1, further comprising:
obtaining a current capacity of the battery; and
a capacity of the battery when full charged being equal to the current capacity of the battery.

10. An electronic device, comprising:
a battery; and
a processor used to implement a charging method to charge the battery, and the charging method comprising:
charging the battery with a first charge current at constant current in a mth charge-discharge cycle of the battery, wherein the battery has a first cut-off voltage when a constant current charging stage of the battery is cut off in the mth charge-discharge cycle;
wherein the first charge current is calculated according to a formula $I_m=I_n+k\times I_n$, wherein, $0 \le k \le 1$, $I_m$ is the first charge current, $I_n$ is the charging current of the constant current charging stage of the battery or another battery identical to the battery in the nth charge-discharge cycle, or $I_n$ is a preset value, n is an integer and is greater than or equal to 0, and m is an integer greater than n, a value of k is not the same in at least two charge-discharge cycles of the battery.

11. A non-transitory storage medium having stored instructions of a charging method for a battery thereon, the instructions being loaded and executed to charge the battery by a processor, and the charging method comprising:
charging the battery with a first charge current at constant current in a mth charge-discharge cycle of the battery, wherein the battery has a first cut-off voltage when a constant current charging stage of the battery is cut off in the mth charge-discharge cycle;
wherein the first charge current is calculated according to a formula $I_m=I_n+k\times I_n$, wherein, $0<k \le 1$, $I_m$ is the first charge current, $I_n$ is the charging current of the constant current charging stage of the battery or another battery identical to the battery in the nth charge-discharge cycle, or $I_n$ is a preset value, n is an integer and is greater than or equal to 0, and m is an integer greater than n, the value of k is not the same in at least two charge-discharge cycles of the battery.

12. The non-transitory storage medium as recited in claim 11, wherein k is calculated according to a formula $k=k_1 m + k_2$, where $0 \le k_1 \le 0.001$, $0 \le k_2 \le 0.2$.

13. The non-transitory storage medium as recited in claim 11, wherein $k \times I_n = (U_{m-1}-U_n)/R_a$, is an integer greater than 1, wherein $U_n$ is a first anode potential of the battery when the battery is charged at constant current to a voltage $U_{cl}$ of the battery in nth charge-discharge cycle, $U_{m-1}$ is a second anode potential of the battery when the battery is changed at constant current to the voltage $U_{cl}$ in (m−1)th charge-discharge cycle, $R_a$ is an anode impedance of the battery when the battery is charged in nth charge-discharge cycle, $U_{cl}$ is a charging limit voltage of the battery or another battery identical to the battery.

14. The non-transitory storage medium as recited in claim 11, wherein the first charging current of the battery is calculated according to formula $I_m = I_{m-1} + (U_{m-1} - U_{m-2})/R_a$, m is an integer greater than 2, wherein $U_{m-1}$ is a second anode potential of the battery when the battery is changed at constant current to the voltage $U_{cl}$ in (m−1)th charge-discharge cycle, $R_a$ is an anode impedance of the battery when the battery is charged in nth charge-discharge cycle, $I_{m-1}$ is a third charging current of the battery when the battery is charged at constant current in (m−1)th charge-discharge cycle, $U_{m-2}$ is a third anode potential of the battery when the battery is charged at constant current to the voltage $U_{cl}$ of the battery in (m−2)th charge-discharge cycle, $U_{cl}$ is a charging limit voltage of the battery or another battery identical to the battery.

15. The non-transitory storage medium as recited in claim 11, the charging method for a battery further comprising:
    obtaining a first state of charge of the battery when the battery is charged at constant current to the voltage $U_{cl}$ in (m−1)th charge-discharge cycle; and
    charging the battery with the first charging current $I_m$ of the battery in mth charge-discharge cycle, until the battery is charged to the first state of charge.

16. The non-transitory storage medium as recited in claim 11, wherein the first cut-off voltage is calculated according to a formula $V_1 = V_2 + b$, wherein $V_1$ is the first cut-off voltage, $0 \le b \le 0.5$, $V_2$ is a second cut-off voltage when the constant current charging stage of the battery or another battery identical to the battery is cut off in the nth charge-discharge cycle, or $V_2$ is a charging limit voltage of the battery or a preset value, a value of b is not the same in at least two charge-discharge cycles of the battery.

17. The non-transitory storage medium as recited in claim 16, wherein b is calculated according to a formula $b = b_1 \times m + b_2$, wherein $0 \le b_1 \le 0.0005$, $0 \le b_2 \le 0.1$.

18. The non-transitory storage medium as recited in claim 11, wherein determining the first cut-off voltage of the battery comprising:
    obtaining a battery impedance in the (m−1)th charge-discharge cycle of the battery;
    calculating the first cut-off voltage $V_1$ of the battery according to a formula $V_1 = V_2 + R_x(I_m - I_n)$, wherein, R is the battery impedance, $V_1$ is the first cut-off voltage, $V_2$ is a second cut-off voltage of the battery when a constant current charging stage of the battery or another battery identical to the battery is cut off in the nth charge-discharge cycle of the battery.

19. The non-transitory storage medium as recited in claim 11, the charging method for a battery further comprising:
    obtaining a current capacity of the battery; and
    a capacity of the battery when full charged being equal to the current capacity of the battery.

\* \* \* \* \*